3,766,140
FILM FORMING POLYESTERS FROM HALOGENATED PHENOLS AND A MIXTURE OF ISOPHTHALIC AND TEREPHTHALIC ACID AND ELECTRICAL INSULATION OF SAME

Roshdy Ismail, Spich, Germany, assignor to Dynamit Nobel AG, Troisdorf, Germany
No Drawing. Continuation of application Ser. No. 835,918, June 23, 1969. This application July 30, 1971, Ser. No. 167,793
Claims priority, application Germany, June 21, 1968, P 17 70 686.4
Int. Cl. C08g 17/08
U.S. Cl. 260—47 C          7 Claims

ABSTRACT OF THE DISCLOSURE

Thermostable electrical insulation sheets, films, coatings and impregnations made from polyester polymers of the general formula

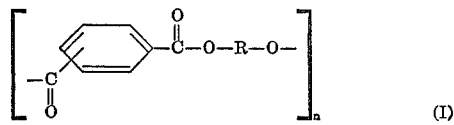

(I)

wherein $n$ is a whole number from 80 to 300, preferably from 100 to 255, and R represents a bivalent organic radical which contains two chlorinated phenylene radicals, and may contain, if desired, an alkylene group, a sulfonyl group or an oxygen atom between the two chlorinated phenylene radicals. The chlorinated phenylene moiety may constitute 1 to 40 mole-percent, of the polymer. About 20 to 99%, and preferably 30 to 80%, of the carbonyl ester groups on the non-chlorinated phenylene radical of the above formula are in the meta position in relation to one another, and the rest are in the para position.

---

This application is a continuation of application Ser. No. 835,918 of June 23, 1969, now abandoned.

This invention relates to novel thermostable polymeric formed articles. It more particularly refers to such articles of special polyester polymers.

It is known to produce polyesters by reacting mixtures of terephthalic acid dichloride and isophthalic acid dichloride with halogenated bivalent phenols, in organic solvents if desired, in the presence of basic catalysts at temperatures of about 50 to 250° C.

The reaction of either terephthalic acid dichloride or of isophthalic acid dichloride alone with halogenated bivalent phenols results in insoluble polymers which cannot be used as starting materials for producing the sheets or other articles of this invention. Polyesters in which more than 80% of the acid moieties consist of terephthalic acid radicals are also insoluble in organic solvents.

It is an object of this invention to provide a novel polyester polymer composition.

It is a further object of this invention to provide thermostable shaped articles of the novel polyester polymers of this invention.

Other and additional objects of this invention will become apparent from a consideration of this entire specification including the claims hereof.

In accord with and fulfilling these objects, one aspect of this invention resides in a novel polyester polymer composition which is a joint polymerizate of terephthalic and isophthalic acid moieties and halogenated bivalent phenol having the following structural formula:

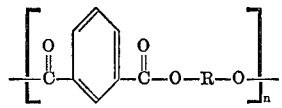

where $n=$about 80 to 300, preferably 100 to 255, R is a bivalent halogenated phenyl group, and where the ester groups are about 20 to 99%, preferably 30 to 80% meta to each other with substantially all of the remainder para to each other.

Optimum thermal and electrical properties are displayed by those materials according to the invention which consist of polyesters in which the percentage of terephthalic acid radicals in the polymer chain amounts to from 20 to 70%. These polymers are especially well suited for use in producing electrical insulation.

The polyester polymers of this invention are suitably prepared by condensation polymerization of one or more suitable bivalent, halogenated phenols with mixed terephthaloyldichloride and isophthaloyl dichloride. The condensation is in itself conventional except for the raw material reaction mixture used and the polymer product produced. Catalysts can be used if desired. These include tertiary amines whose amino group is or is not a component of an aromatic ring system, and/or N-mono- or N-disubstituted or unsubstituted acid amides, phosphines, arsines, stibines and similar compounds. The catalyst may be used in quantities of about 0.1 to 20 mole-percent with reference to the acid halide reactant. The quaternary ammonium, phosphonium, etc. compounds of these catalysts can also be used, especially the hydrochlorides or the corresponding salts prepared from halogenated phenols and the tertiary amines. It is particularly desirable to use as the catalyst the salt of a tertiary amine and the reactant halogenated bivalent phenol.

The principal halogenated divalent phenols for the synthesis of the polyesters used for making the electrical insulation sheets and the like according to the invention are bis-(3,5-dichloro-4-hydroxyphenyl) - alkanes, such as 2,2-bis-(3,5-dichloro-4-hydroxyphenyl) - propane, for example. Using these phenols, the organic radical R, in the above polymer formula, has a general formula

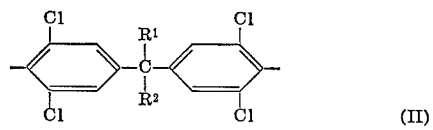

(II)

wherein $R^1$ and $R^2$ can be the same or different, and represent hydrogen or an alkyl group having 1 to 5 carbon atoms.

This invention also covers those polymers and electrical insulation sheets, films, coatings and impregnating agents made therefrom which consist of polyesters which contain, in addition to the R groups of the above Formula II, other bifunctional phenol radicals, such as chlorinated hydroquinone, e.g., tetrachlorohydroquinone, or radicals of chlorinated diphenols in general. Electrical insulation materials are of special technical interest, and are therefore to be stressed, which are made of polyesters according to Formula I, in which 60 to 99 mole-percent, and preferably 80 to 98 mole-percent of the organic radical R in the high-polymer polyester chain corresponds to the Formula II, and the rest, to make up 100 mole-percent, consist of a tetrachlorophenylene radical. Since these special polyesters within these specific mixture ranges are new and are also of special technical interest as regards other applications, these polyesters, which are starting materials in the preparation of the electrical insulating material, are a subject of this invention. These special polyesters are characterized, for example, by a very high resistance to hydrolysis. They are only slightly soluble in organic solvents. They are therefore very useful materials for many applications.

The polyesters of which the electrical insulation sheets, films, coatings and impregnating agents according to the invention are made have molecular weights of about 40,000 to 160,000, preferably from 70,000 to 130,000. These values have been estimated on the basis of the molecular weight distribution curves recorded by means of the gel chromatographic method, using an apparatus Model 200 of Waters Assoc. Inc., U.S.A. Reduced viscosities which were measured in 0.5% solutions in chloroform 25° C., were between 0.9 and 2.3 These viscosities were determined according to DIN 53,726, as were all the other viscosities stated herein. In all cases the conditions of measurement were the same.

The electrical insulating material according to the invention utilizing these high molecular weight polyesters represent a considerable technical advance in relation to the polyesters used for this purpose in the present state of the art, which have molecular weights of up to about 30,000. The high molecular weights not only provide higher softening ranges and higher viscosities, but also are particularly favorable to thermal stability. For example, if an insulating sheet material prepared from a polyester which is composed of 2,2-bis-(3,5-dichloro-4-hydroxyphenyl)-propane and a mixture of iso- and terephthalic acid dichlorides (the latter in a 1:1 mole ratio), and which has a reduced viscosity of 1.5, is exposed to the air for a long time at a temperature of 180° C., and if the same experiment is performed simultaneously with an insulating sheet material made according to the state of the art from a polyester having a reduced viscosity of 0.6, the following result is obtained. After only 1 week, the material according to the state of the art is considerably degraded by the action of heat and oxygen, so that the viscosity measurements produce correspondingly low figures. On the other hand, even after 40 days, the insulating sheet material according to this invention displays no signs of degradation, and there is scarcely any change in the reduced viscosity after this long period of exposure.

The high-temperature-resistant electrical insulating sheets, films, coatings and impregnations made from the described polyesters according to this invention are of interest to many fields of electrical engineering. In the present state of the art, electrical parts such as cables, condensers, coil parts and the like are covered and insulated with sheets and films of polyethylene terephthalate, polycarbonates and polyimides. These kinds of insulation suffer from many physical disadvantages, so that the application of the sheet materials of the present state of the art is very limited. In fact, many special problems cannot be solved by the use of such insulating sheet materials.

For example, the dielectric loss factors of polyethylene terephthalate and most polycarbonates are too high for many applications. Also, this loss factor increases with frequency for both these high polymers, which is often undesirable and harmful. Sheets made from polyimides also exhibit the same appreciable and undesirable direct relationship between dielectric loss factor and frequency. Polyethylene terephthalate or polycarbonate sheet materials also have relatively disadvantageous softening characteristics.

Surprisingly, it has been found that the electrical insulation sheet materials, films and the like according to this invention do not display these deficiencies. They have a very low dielectric loss factor, which is furthermore substantially independent of frequency. Because of the outstanding thermal stability of the electrical insulation materials according to the invention, they can also be used at elevated temperature.

The insulation materials according to the invention can, because of these excellent properties, be used in direct-current condensers, transformers, choke coils and printed circuits, among other things. Also, they can be used as slot insulation, slot splines, cover strips and conductor wrappings for motors and generators, and side parts and inserts in electrical appliances. Also, they can be used for coil winding cores and for guards for electric cables.

The electrical insulation sheets, films and coatings of the invention are prepared from solutions of the thermostable polyesters in aliphatic or aromatic hydrocarbons, in simple or cyclic ethers, or in halogenated hydrocarbons. The concentration of the solutions thus prepared is advantageously between about 0.5 and 10% by weight. In the manufacture of films by the casting method it is advantageous to use conventional spreading machines with suitable spreading blades. The thickness of the sheets can be varied at will. The solutions can also be sprayed on, and the sheets formed by drying can be given two or more additional applications.

Direct coating and impregnation of electrical parts with the polyester soltuion is possible, for example, by dipping, brushing on or spraying. This, too, is suitably followed by a drying treatment and may be repeated.

EXAMPLE 1

(A) Preparation of the polyester

In a three-necked flask provided with stirrer, reflux condenser and gas introduction tube, 73.2 g. of 2,2-bis-(3,5-dichloro-4-hydroxyphenyl)-propane (M.P. 135° C.), 20.3 g. of terephthalic acid dichloride and 20.3 g. of isophthalic acid dichloride were dissolved in 500 ml. of O-dichlorobenzene, and 0.5 ml. of quinoline were added to the solution. This reaction mixture was heated with stirring to the boiling temperature of the O-dichlorobenzene. A reaction took place with hydrogen chloride evolution. The mixture was kept at the boiling temperature until the theoretical quantity of hydrogen chloride had been evolved.

The polyester thus obtained was precipitated by the addition of methanol, filtered off, and vacuum dried at about 200° C. The following characteristics were determined.

Yield: Approx. 98% of the theory.
Melting range, determined by means of the Kofler test apparatus: 340–370° C.
Thermal stability according to Vicat (DIN 53,460): approx. 243° C.
Molecular weight determined by gel chromatographic measurement: $126 \times 10^3$.
Reduced viscosity: 1.5.

(B) Preparation of the electrical insulation sheet material 14 g. of the polyester thus prepared was dissolved in 200 ml. of chloroform. The 7% solution thus obtained was put into a spreader and spread onto a glass sheet. After drying, a sheet was obtained which was heated for 10 more hours at 180° C. in a vacuum drying oven. The end product was a transparent, colorless sheet about 0.1 mm. thick, having the following mechanical properties:

| | Kp./cm.$^2$ |
|---|---|
| Tensile strength at 20° C. | 910 |
| Modulus of elasticity | 27,000 |
| Tearing strength | 18 |

The sheet was self-extinguishing. Its good electrical properties are shown in Tables 2 and 3 below. In Table 3 they are compared with the properties of conventional materials.

EXAMPLE 2

In a three-necked flask provided with stirrer, condenser and introduction tube, 65.9 g. of 2,2-bis-(3,5-dichloro-4-hydroxyphenyl)-propane, 4.96 g. of tetrachlorohydroquinone, 20.3 g. of terephthalic acid dichloride and 20.3 g. of isophthalic acid dichloride were made to react in the presence of 0.5 ml. of N,N-dimethylcyclohexylamine in 500 ml. of o-dichlorobenzene. The reaction mixture was kept at the boiling temperature of the o-dichlorobenzene, with stirring, until the theoretical amount of hydrogen chloride had been evolved. The resulting product was precipitated by means of methanol, separated, and vacuum-dried at 200° C.

Melting range: 325–360° C.
Reduced viscosity: 1.25.
Yield: 98% of the theory.

EXAMPLES 3 to 5

In the further experiments the procedure was entirely the same as in Example 2, except that, instead of 65.9 g. of 2,2 - bis-(3,5-dichloro-4-hydroxyphenyl)-propane and 4.96 g. of tetrachlorohydroquinone, the quantities of these starting substances which are listed in Table 1 were used. This table lists the characteristics of the polycondensates prepared in each case. The yield in the synthesis amounted in all cases to 98% of the theory.

EXAMPLE 6

14 g. of the polyester prepared according to Example 4 were dissolved in 200 ml. of chloroform. The 7% solution thus obtained was put in a spreader and spread onto a glass sheet. After preliminary drying a sheet was obtained, which was then oven dried at 180° C. for 10 hours. The transparent sheet that finally resulted had a thickness of 0.7 to 0.8 mm. and the following mechanical characteristics:

Tensile strength at 20° C.: 925 kp./cm.$^2$
Elongation: 8.5%.
Elasticity modulus: 29,500 kp./cm.$^2$.

The sheet was self-extinguishing. Its good electrical properties are set forth in Tables 3 and 4, and in Table 3 they are compared with the properties of conventional sheet materials.

TABLE 1

| Example Number | 3 | 4 | 5 |
|---|---|---|---|
| Quantity of 2,2-bis-(3,5-di-chloro-4-hydroxyphenyl)-propane in, grams | 67.71 | 69.55 | 71.37 |
| Quantity of tetrachlorohydroquinone in, grams | 3.72 | 2.48 | 1.24 |
| Melting range in, ° C | 325–360 | 325–360 | 330–360 |
| Reduced viscosity | 1.3 | 1.3 | 1.4 |
| Molecular weight | 107×10$^3$ | 100×10$^3$ | 112×10$^3$ |

TABLE 2

| Frequency (Hz.) | Temperature (° C.) | Dielectric loss factor $\delta \times 10_4$ | Dielectric constant $\epsilon$ |
|---|---|---|---|
| 10$^3$ | 20 | 42 | 2.8 |
| 10$^4$ | 20 | 37 | 2.8 |
| 10$^5$ | 20 | 42 | 2.8 |
| 10$^6$ | 20 | 40 | 2.7 |
| 10$^7$ | 20 | 38 | 2.7 |
| 7.10$^7$ | 20 | 42 | 2.7 |
| 10$^6$ | 20 | 40 | 2.8 |
|  | 100 | 38 | 2.8 |

TABLE 3(a)

| Type of polymer | Softening temp.[1] ° C. | Dielectric loss factor tan δ at 1 MHz. and 2°0 C. | Dielectric constant$\epsilon$ at 1 MHz and 20° C. |
|---|---|---|---|
| According to invention per Ex. 1 | 230 | 40×10c$^{-4}$ | 2.7 |
| According to invention per Ex. 6 | 240 | 38×10c$^{-4}$ | 2.7 |
| Polyethylene terephthalate | 80 | 200×10c$^{-4}$ | 3.1 |
| Polycarbonate | 140 | 90×10c$^{-4}$ | 2.7 |

[1] As determined by torsional oscillation test per DIN 53445.

TABLE 3(b)

| Type polymer | Volume resistance in ohms at, 20° C | Weight loss after 1 day's exposure to elevated temp. ° C. | Weight, percent | Not inflammable to gases at ° C |
|---|---|---|---|---|
| According to invention per Ex. 1 | 4×10$^{16}$ | 180 | 0.2 | 400 |
| According to invention per Ex. 6 | 4×10$^{16}$ | 180 | 0.2 | 400 |
| Polyethylene terephthalate | 10$^{17}$ | 130 | 0.15 | 400 |
| Polycarbonate | 10$^{17}$ | 120 | 1.0 | 400 |

TABLE 4

| Frequency (Hz.) | Temperature (° C.) | Dielectric loss factor $\delta \times 10^4$ | Dielectric constant $\epsilon$ |
|---|---|---|---|
| 10$^3$ | 20 | 38 | 2.8 |
| 10$^4$ | 20 | 37 | 2.8 |
| 10$^5$ | 20 | 41 | 2.8 |
| 10$^6$ | 20 | 38 | 2.7 |
| 10$^7$ | 20 | 38 | 2.7 |
| 10$^8$ | 20 | 42 | 2.7 |
| 10$^6$ | 20 | 38 | 2.7 |
|  | 100 | 40 | 2.7 |

What is claimed is:

1. Film-forming polyester polymers of the formula

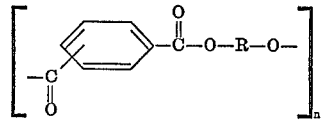

wherein $n$ is about 80 to 300, R is a mixture of 1 to 40 mol percent of a tetrachlorinated hydroquinone and a chlorinated dicyclic phenylene group of the formula

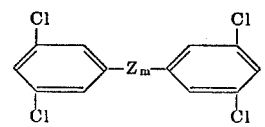

and wherein about 20 to 99% of the ester groups thereof are in the meta position with respect to the acid moiety with substantially all of the remainder in the para position with respect to the acid moiety, Z is selected from the group consisting of alkylene, sulfonyl and oxygen, $n$ is zero or 1, said polyester being soluble in chloroform to form a solution having a concentration between 0.5 and 10% by weight.

2. Polyester polymers claimed in claim 1 wherein about 30 to 80 of said ester groups are meta.

3. Polyester polymers claimed in claim 1 wherein there are about 100 to 255 recurring units.

4. Polyester polymers claimed in claim 1 wherein said chlorinated dicyclic diphenol comprises about 80 to 98 mole percent of said polyester.

5. Thermostable electrical sheets comprising the polyester claimed in claim 4.

6. Thermostable electrical sheets comprising the polyester polymer claimed in claim 1 wherein said chlorinated monocyclic diphenol constitutes at least 1 mol percent of said polyester.

7. A film-forming polyester polymer according to claim 1 wherein the polyester is soluble in an aliphatic or aromatic hydrocarbon, a cyclic ether and a halogenated hydrocarbon.

References Cited

UNITED STATES PATENTS

| | | | |
|---|---|---|---|
| 3,133,898 | 5/1964 | Keck | 260—47 |
| 3,160,602 | 12/1964 | Kantor et al. | 260—47 |
| 3,161,710 | 12/1964 | Turner | 260—75 |
| 3,234,167 | 2/1966 | Sweeny | 260—47 C X |
| 3,234,168 | 2/1966 | Hare | 260—47 |

FOREIGN PATENTS

| | | | |
|---|---|---|---|
| 897,640 | 5/1962 | Great Britain | 260—47 C |

HAROLD D. ANDERSON, Primary Examiner

L. L. LEE, Assistant Examiner

U.S. Cl. X.R.

117—124 E, 161 K; 260—30.4 R, 33.2 R, 33.6 R, 33.8 R, 61, Dig. 24

PO-1050
(5/69)

UNITED STATES PATENT OFFICE
CERTIFICATE OF CORRECTION

Patent No. 3,766,140         Dated October 16, 1973

Inventor(s) Roshdy Ismail

It is certified that error appears in the above-identified patent and that said Letters Patent are hereby corrected as shown below:

Column 5, line 59 (Table 3(a))

In the second column from the right "2°C." should read "20°C."

Column 5, line 60 (Table 3(a))

In the second column from the right all "10c$^{-4}$" should read "10$^{-4}$".

Signed and sealed this 18th day of June 1974.

(SEAL)
Attest:

EDWARD M. FLETCHER, JR.
Attesting Officer

C. MARSHALL DANN
Commissioner of Patents